No. 716,204. Patented Dec. 16, 1902.
A. G. DE WALDO.
GUARD FOR WATER METERS.
(Application filed Apr. 15, 1902.)
(No Model.)
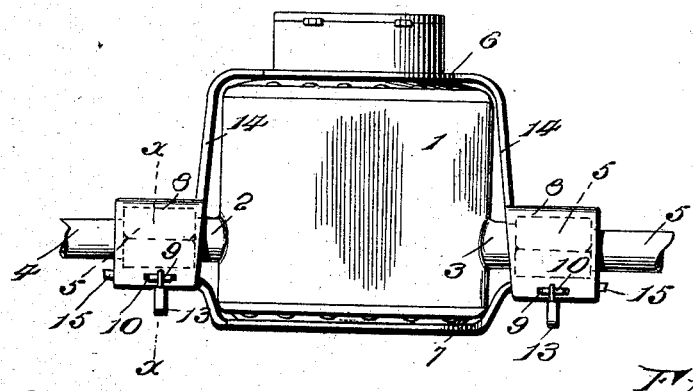
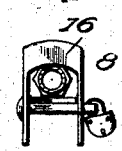
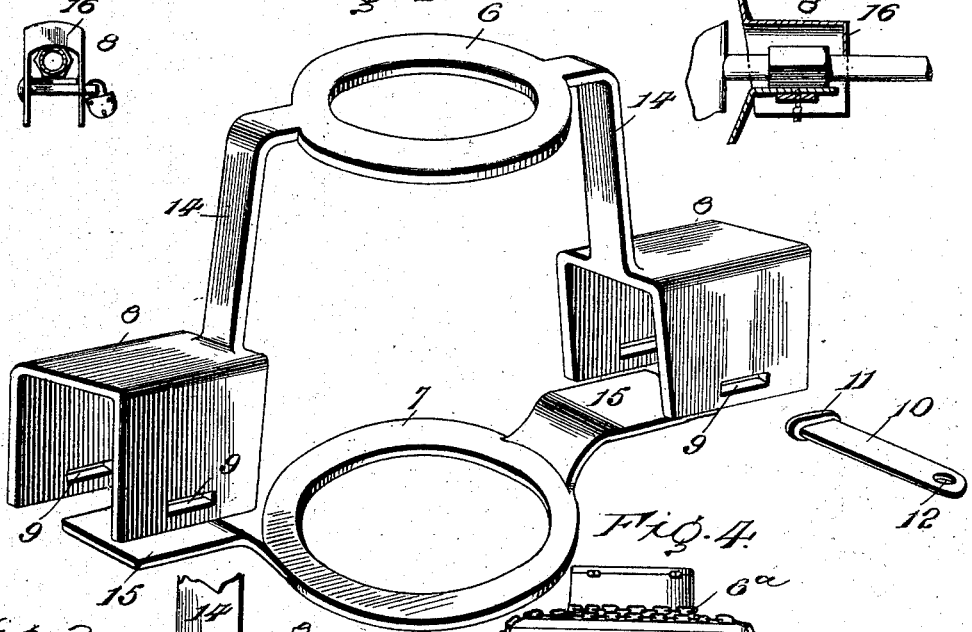
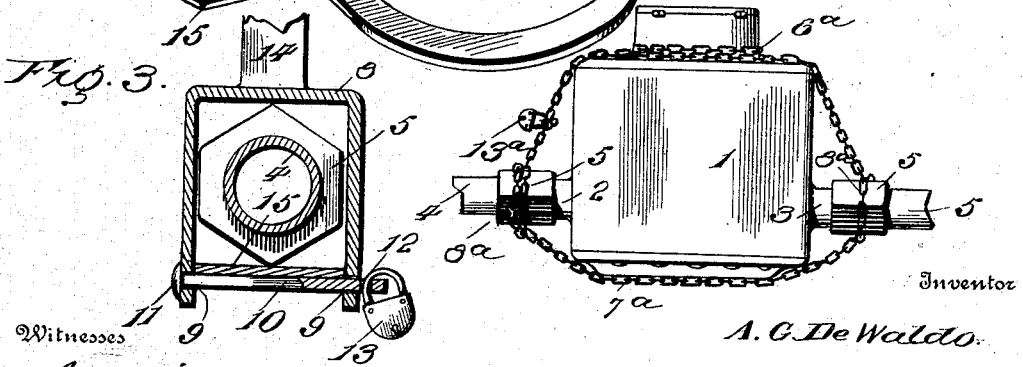
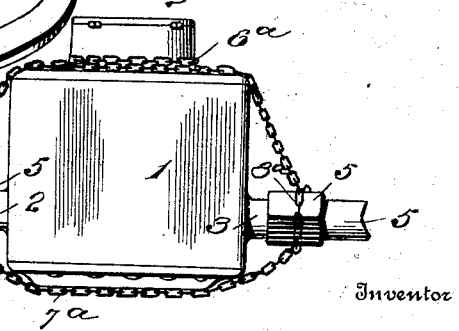
Inventor
A. G. De Waldo.
Witnesses
By
Attorneys

UNITED STATES PATENT OFFICE.

ALFONSO G. DE WALDO, OF WARREN, OHIO.

GUARD FOR WATER-METERS.

SPECIFICATION forming part of Letters Patent No. 716,204, dated December 16, 1902.

Application filed April 15, 1902. Serial No. 103,025. (No model.)

*To all whom it may concern:*

Be it known that I, ALFONSO G. DE WALDO, a citizen of the United States, residing at Warren, in the county of Trumbull and State of Ohio, have invented certain new and useful Improvements in Guards for Water-Meters; and I do hereby declare the following to be a full, clear, and exact description of the invention, such as will enable others skilled in the art to which it appertains to make and use the same.

This invention relates to a fraud-preventive device for registering mechanisms, such as water-meters, and aims to guard against tampering with water-meters in any manner, either by reversing the meter, setting back the registering mechanism, or any of the nefarious practices commonly resorted to for indicating a less amount of water than actually used or passed through the meter.

The purpose of the invention is to render the interior of the meter inaccessible and to obviate uncoupling or loosening of the joints between the meter and the supply and distributing pipes.

The invention consists of a guard embracing the meter and the couplings or joints between the said meter and the pipes connected therewith, said guard being of such construction as to admit of attainment of the desired end.

For a full description of the invention and the merits thereof, and also to acquire a knowledge of the details of construction of the means for effecting the result, reference is to be had to the following description and drawings hereto attached.

While the essential and characteristic features of the invention are susceptible of modification, still the preferred embodiment of the invention is illustrated in the accompanying drawings, in which—

Figure 1 is a side view of a water-meter and the preferred form of guard applied thereto. Fig. 2 is a perspective view of the guard, the parts being separated. Fig. 3 is a detail section about on the line X X of Fig. 1. Fig. 4 is a side view of a modification. Fig. 5 is an end view of a modification. Fig. 6 is a longitudinal section of the modification shown in Fig. 5.

Corresponding and like parts are referred to in the following description and indicated in all the views of the drawings by the same reference characters.

The meter 1 may be of any make or design and is provided with tubular extensions 2 and 3 to be coupled to pipes 4 and 5, the one leading from the main and the other being connected with the service-pipe in the house, building, or other structure to be supplied with water. Unions 5 connect the pipes 4 and 5 with the tubular extensions 2 and 3 and may be thimbles or couplings of any kind commonly employed for joining the ends of contiguous pipes. The foregoing features are common and are illustrated to show the application of the invention, which consists of the means employed for protecting the meter and the joints between said meter and the pipes 4 and 5.

The guard comprises portions 6, 7, and 8 for embracing opposite parts of the meter and the couplings 5. The part 6 encircles the crown of the meter and overlaps the base of the crown, so as to prevent removal or displacement of said crown even though the fastenings connecting the crown with the body of the meter are removed. The part 7 encircles the depressed portion of the base and underlaps the flange surrounding the said depressed portion and prevents removal of the base of the meter even should one succeed in loosening the fastenings. The parts 8 are U-shaped housings and embrace the top and opposite sides of the couplings 5, and slots 9 are formed near the lower ends of the side members to receive keys or yokes 10, which extend beneath the couplings 5 and are headed at one end, as shown at 11, and provided with openings 12, near the opposite end, to receive a padlock 13 or other securing means. Arms 14 connect the parts 6 and 8. Arms 15 project outwardly from the parts 7 and are adapted to rest upon the keys or yokes 10 and are confined between said parts 10 and the bottom side of the couplings 5. The upper portion of the guard, comprising the parts 6, 8, and 14, may be constructed of sheet metal or casting and the lower part, comprising the elements 7 and 15, may be similarly constructed. When the guard is in place, as shown in Figs. 1 and 3, access to the interior of the meter is prevented and the meter cannot be uncoupled, because the joints 5 are protected by the housings 8. The locking means 13 may be of any character commonly utilized for such purposes, and any attempt to remove the guard resulting in tampering with the same in any manner will render the detection possible.

While the construction herein described is preferred, yet within the purview of the invention it is contemplated to employ other forms of the invention, and Fig. 4 illustrates another way of attaining the same end, a chain being provided and having portions embracing the couplings 5 and the upper and lower parts of the meter, parts of the chain being wrapped around the crown of the meter, as shown at 6ª, to correspond to the part 6, another portion extending beneath the meter, as shown at 7ª, to correspond to the part 7, and portions being wrapped around the couplings 5, as shown at 8ª, to correspond to the housings 8. The ends of the chain are secured in any way, as by means of the lock 13ª. Obviously the chain may be substituted by any similar flexible means capable of being bent so as to prevent tampering with either the meter or the joints between said meter and the supply and distributing pipes.

In the modification shown in Figs. 5 and 6 the housing 8 at each end of the guard is provided at its outer end with a lip or web 16 to rest upon the pipe exterior to the coupling 5, so as to support the guard and prevent access to the coupling in the event of the guard being fitted to a small-sized pipe. This construction also gives additional strength.

Having thus described the invention, what is claimed as new is—

1. In combination with a meter and couplings connecting the same with the supply and distributing pipes, a guard comprising parts embracing upper and lower portions of the meter and housings for the said couplings, whereby access to the meter and joints is prevented, substantially as specified.

2. In combination with a meter and couplings between the same and supply and distributing pipes, a guard comprising housings for the couplings, and a part to overlap the upper portion of the meter, keys closing the lower sides of the housings, and securing means for said keys, and a lower element underlapping the meter and having opposite extensions supported within the housings by means of the aforesaid keys, substantially as set forth.

3. In combination with a meter and couplings connecting the same with the supply and distributing pipes, a guard comprising upper and lower parts, the upper part encircling the crown of the meter and overlapping the base of said crown, and approximately U-shaped housings embracing the top and opposite sides of the couplings and the lower part underlapping the base portion of the meter and having opposite extensions entering the lower open sides of the housings, keys supported in the side members of the housings and adapted to hold the lower portion of the guard in place, and securing means cooperating with the keys, substantially as specified.

In testimony whereof I affix my signature in presence of two witnesses.

ALFONSO G. DE WALDO. [L. S.]

Witnesses:
GEO. T. HECKLINGER,
EUGENE W. CHASE.